United States Patent [19]

Schweichler

[11] 4,277,218

[45] Jul. 7, 1981

[54] EXAMINATION INSTALLATION

[75] Inventor: Gerd Schweichler, Dormitz, Fed. Rep. of Germany

[73] Assignee: Siemens Aktiengesellschaft, Berlin & Munich, Fed. Rep. of Germany

[21] Appl. No.: 12,382

[22] Filed: Feb. 15, 1979

[30] Foreign Application Priority Data

Mar. 20, 1978 [DE] Fed. Rep. of Germany ....... 2812074

[51] Int. Cl.³ ............................................. G01N 23/00

[52] U.S. Cl. .......................................... 414/401; 5/86; 250/444; 296/20; 410/80; 410/84; 414/391; 414/399

[58] Field of Search ............... 414/391, 392, 396, 399, 414/401, 584; 269/322; 5/81 R, 86; 250/444, 456, 453; 296/20; 410/80, 84

[56] References Cited

U.S. PATENT DOCUMENTS

| | | | |
|---|---|---|---|
| 3,302,022 | 1/1967 | Brenner et al. | 269/322 X |
| 3,463,921 | 8/1969 | Warden | 250/453 |
| 3,631,546 | 1/1972 | Elliasson | 414/391 X |

*Primary Examiner*—Robert G. Sheridan

*Attorney, Agent, or Firm*—Hill, Van Santen, Steadman, Chiara & Simpson

[57] ABSTRACT

In an exemplary embodiment, a patient can be transferred from a transport carrier onto a table support. Couplings are provided for the connection of the patient positioning table to the transport carrier or to the table support. By means of the invention, a reliable locking of the patient positioning table onto the transport carrier or onto the table support which is independent of human error is to be guaranteed. The locking is to render a rotation of the patient positioning table of 360° around a horizontal axis possible. To this end, the invention provides that each of the couplings contains at least two latches that are rotatable into respective latching positions, of which the one latch which in its latching position couples the patient positioning table to the transport carrier can be pressed out of its latching position by means of the table support and the other latch which in its latching position couples the patient positioning table to the table support can be pressed out of its latching position by means of the transport carrier.

10 Claims, 5 Drawing Figures

EXAMINATION INSTALLATION

BACKGROUND OF THE INVENTION

The invention relates to an examination installation with a patient positioning table that is transferrable from a transport carrier onto a table support, with couplings that adjust themselves upon the approach of the patient positioning table to the transport carrier or table support for connecting the patient positioning table to the transport carrier or table support.

A patient positioning table which can be transferred from a transport carrier onto a table support is known from U.S. Pat. No. 3,463,921. Both the table support as well as the transport carrier are provided with small rollers which, for the vertical attachment of the patient support table, automatically swing into laterally open, U-shaped, longitudinal channels of the patient support table. Since the guiding rollers, insofar as they are allocated to one and the same longitudinal channel, are coupled to one another with respect to their swinging movement, the patient support table can only be uncoupled by means of vertical lifting, not, however, by means of a tilting movement such as is generated upon the loading of a projecting end. In this device, however, it is felt to be disadvantageous that the patient support table is only useable in the horizontal position, because, upon tilting around its transverse axis, it would run off of the rollers of the table support or of the pedestal.

Further, a stretcher which can be coupled with various devices is known from U.S. Pat. No. 3,631,546. The coupling mechanism used in this Letters Patent employs eccentrics which are able to hold the stretcher upon suitable operation in each tilt position. These eccentrics, however, must be separately operated. Before each removal of the stretcher, they must be brought into the non-engaged position and must be turned back into the engaging position after each placement of the stretcher. If, in haste, this is forgotten, then the stretcher together with the patient can fall out of the mounting.

SUMMARY OF THE INVENTION

The object of the invention is to indicate a way in which, with a patient positioning table which is to be operationally tiltable about a horizontal axis, a simple and secure transfer from a transport carrier onto a table support and back again can be attained. Thereby, the solution is to guarantee an absolutely reliable anchoring of the patient positioning table in all tilt positions which is independent of all human shortcomings. Finally, it is to be connected with a small technical outlay.

In an examination installation of the type initially cited, each of the couplings therefor inventively contains at least two latches that can be rotated into one stable end position (i.e. the latching position) each, of which the one latch, which couples the patient positioning table in its latching position with the transport carrier can be pressed out of its latching position by means of the table support and the other latch, which couples the patient positioning table in its latching position with the table support, can be pressed out of its latching position by means of the transport carrier. Such a construction makes it absolutely impossible to release the coupling of the patient positioning table with the table support as long as it is not engaged with the transport carrier and vice versa. No kind of cooperative action of the hospital personnel is required for this.

A particularly progressive construction can be achieved if, in a further development of the invention, each latch is provided with a rearward extension serving the rotation into the non-engaged position, whereby this extension in the case of the latch serving the coupling with the transport carrier is pressed into the non-engaged position upon placement onto the table support, and in the case of the latch serving the coupling with the table support is pressed into the non-engaged position upon placement onto the transport carrier. In this manner, the operating personnel are not called upon at all for the unlocking of the latches and, nonetheless, there is hardly any additional construction outlay for this. Each latch which couples with the transport carrier releases automatically upon the approach of the table support and each latch which couples with the table support releases itself automatically upon the approach of the transport carrier.

The patient positioning table can be kept free of movable coupling parts when, in an embodiment of the invention, a part of the latches are movably mounted on the table support and one part of the latches are movably mounted on the transport carrier. Hereby, bearings to be greased can be avoided on the patient positioning table. This is advantageous if the patient positioning table is to be sterilizable. However, it has proven to be constructionally more expedient when, instead of this, in another embodiment of the invention, the latches of the couplings are all movably mounted on the patient positioning table. This construction is connected with a smaller outlay because bearings for this are only required in one part, namely, on the patient positioning table. At the same time, the housing for the latches can contain both latches at once, both that for the table support as well as that for the transport carrier.

The centering of the transport carrier driven under the table support to the patient positioning table is significantly facilitated when, in an advantageous further embodiment of the invention, guiding means are allocated to the couplings which attain a centering engagement upon the approach of the patient positioning table to the transport carrier or to the table support. This has the particular advantage that one need move the transport carrier only approximately into a prescribed position under the table support. The guiding means then takes care of the exact centering upon the mutual approach.

In a further advantageous embodiment of the invention, the guiding means on the part of the transport carrier and of the table support can respectively consist of four formed parts designed in the manner of a railroad wheel and the guiding means of the patient positioning table which can be brought to engage with these can be respectively designed in the manner of a track piece with a respective guide flank projecting perpendicular to the track plane. This has the advantage that, because of the positive locking engagement, the patient positioning table cannot be displaced in relation to the transport carrier or the table support even in tilt positions. The latches thus need only prevent a perpendicular lift-off of the examination table from its respective base in order to guarantee a secure seating of the examination table in all slueing (tilting) positions.

The construction can be noticeably simplified when, in an expedient further embodiment of the invention, the guide means of the patient positioning table for the transport carrier and the table support are respectively arranged immediately next to one another and are respectively combined into a uniform guide finger formed in the manner of a chain wheel cog.

Further details of the invention are described in greater detail on the basis of a sample embodiment illustrated in the accompanying sheets of drawings; and other objects, features and advantages will be apparent from this detailed disclosure and from the appended claims.

DETAILED DESCRIPTION

Figure 1:
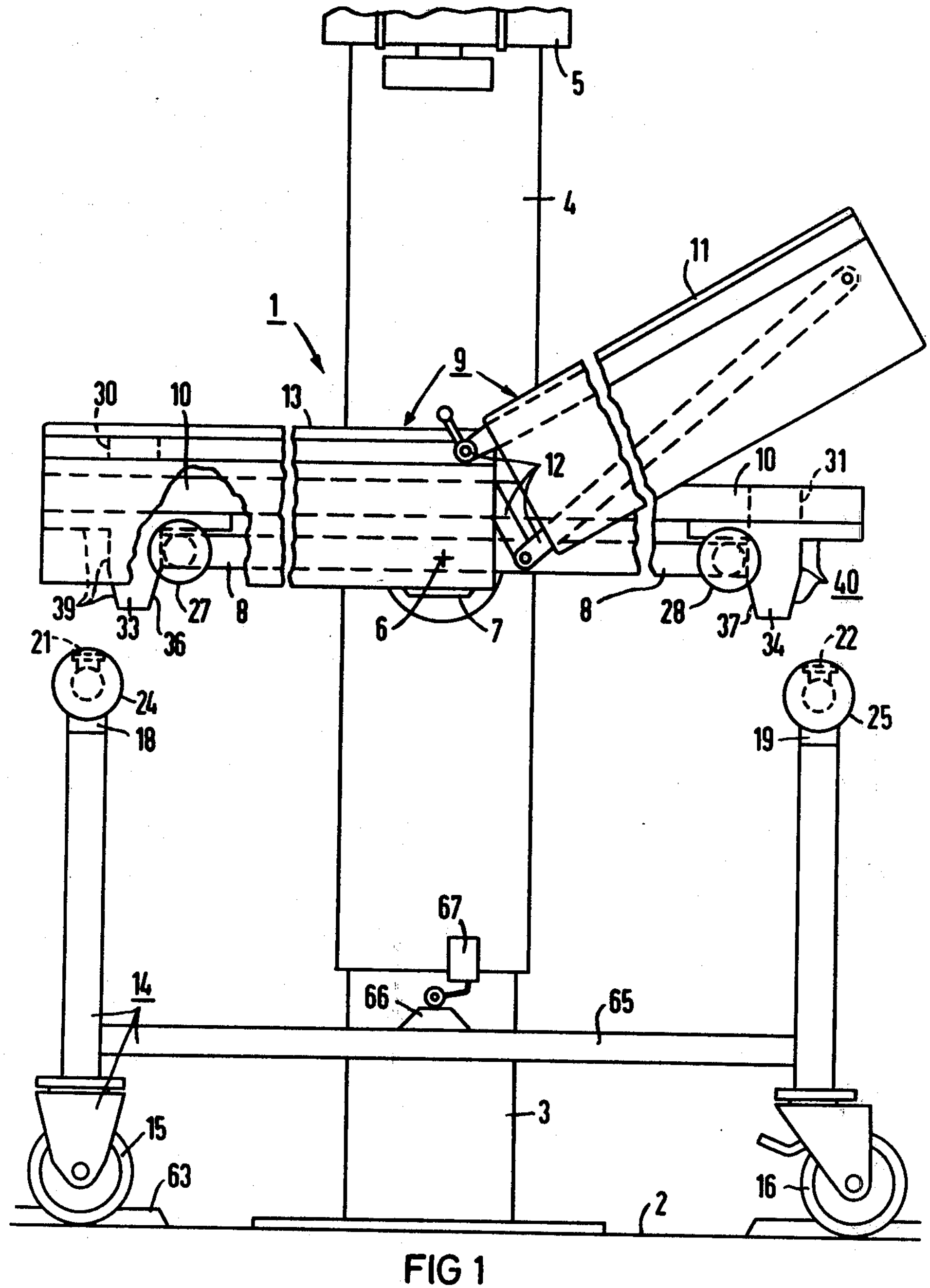
FIG. 1 shows a diagrammatic representation of the side view of a partially broken open positioning table resting on a table support immediately after the lifting off of said positioning plate from the transport carrier.
Figure 2:
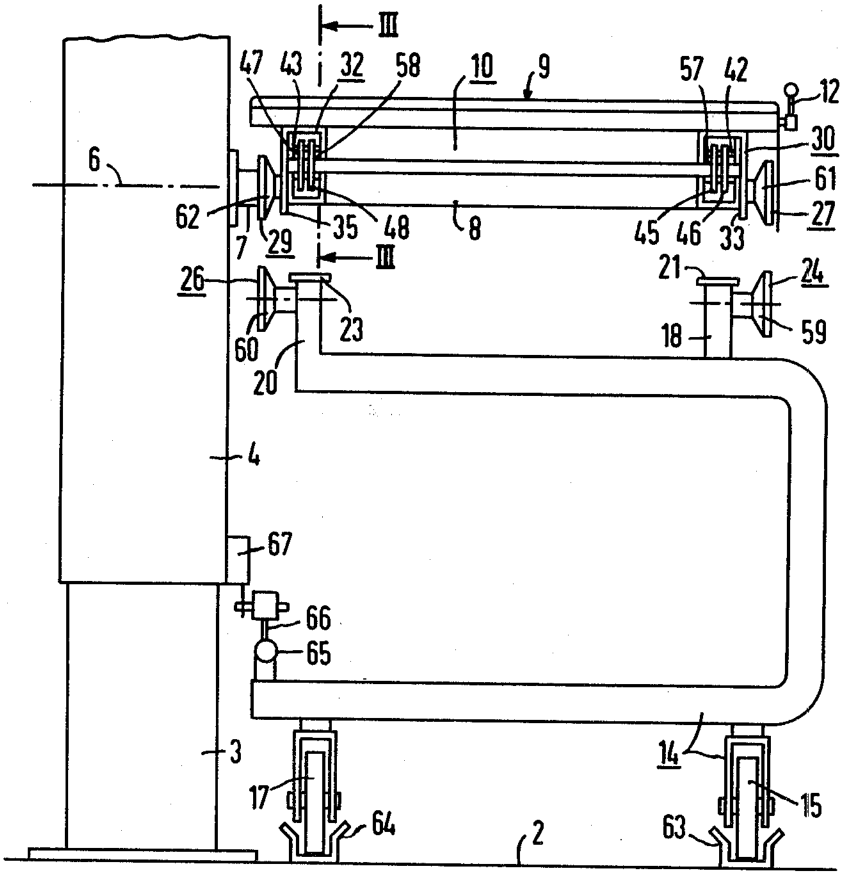
FIG. 2 shows a front view of FIG. 1.

FIGS. 1 and 2 show the construction of the examination installation 1 in a diagrammatic representation. A support pillar 4, adjustable in height, is seated on a pedestal 3 anchored to the floor 2. The support pillar 4 carries the x-ray tube 5 as well as a pivot 7 rotatable around a horizontal tilt axis 6. A support frame 8 for a patient positioning table 9 is secured to this pivot 7. In the illustrations of FIGS. 1 and 2, the patient positioning table 9 with its frame 10, rests on the support frame 8 of the support pillar. The patient positioning table shown in FIG. 1 is executed in two parts. The one, head-end part 11 of the patient positioning table 9 is illustrated in FIG. 1 in a position placed diagonally to the other, foot-end part 13 of the patient positioning table, this being achieved by means of a slueing (tilting) mechanism 12.

A transport carrier 14 designed for the reception of the patient positioning table 9 is shown in FIGS. 1 and 2 underneath the patient positioning table 9 and underneath the support frame 8 for the patient positioning table raised up along with the support pillar 4. The transport carrier 14 has four casters 15, 16, 17 (only three are illustrated) and carries four vertical posts 18, 19, 20 (only three are illustrated) on its top side each with a protruding coupling plate 21, 22, 23 on top and each with a formed part 24, 25, 26 for centering the transport carrier 14 with the patient positioning table 9. The support frame 8 for the patient positioning table 9 secured to the support pillar 4 is also provided with four similar formed pieces 27, 28, 29. In the direction perpendicular to the patient positioning table 9, the formed pieces of the transport carrier 14 and of the support frame 8 are mutually arranged at the same interval, similar to the track width in railroad cars. In the longitudinal direction of the patient positioning table, however, the formed pieces of the transport carrier and of the support frame are arranged with different intervals, similar to the axle interval in railroad cars.

Figure 3:
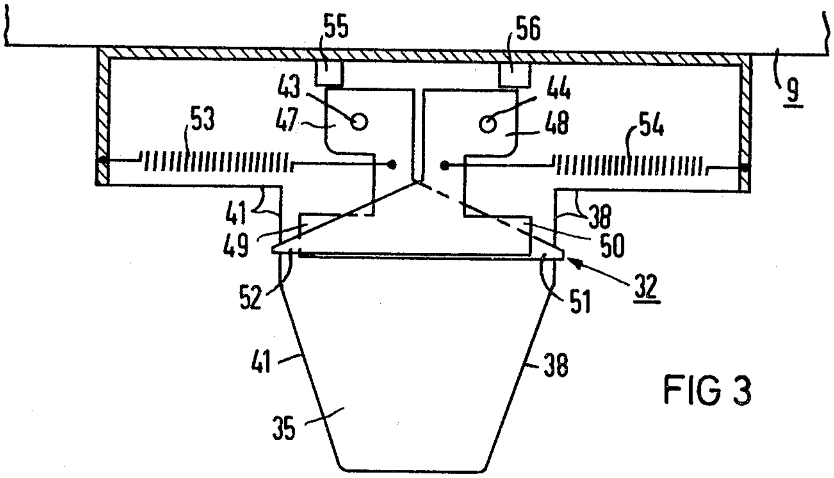
FIG. 3 shows a section taken along the lines III—III of FIG. 2.
Figure 4:
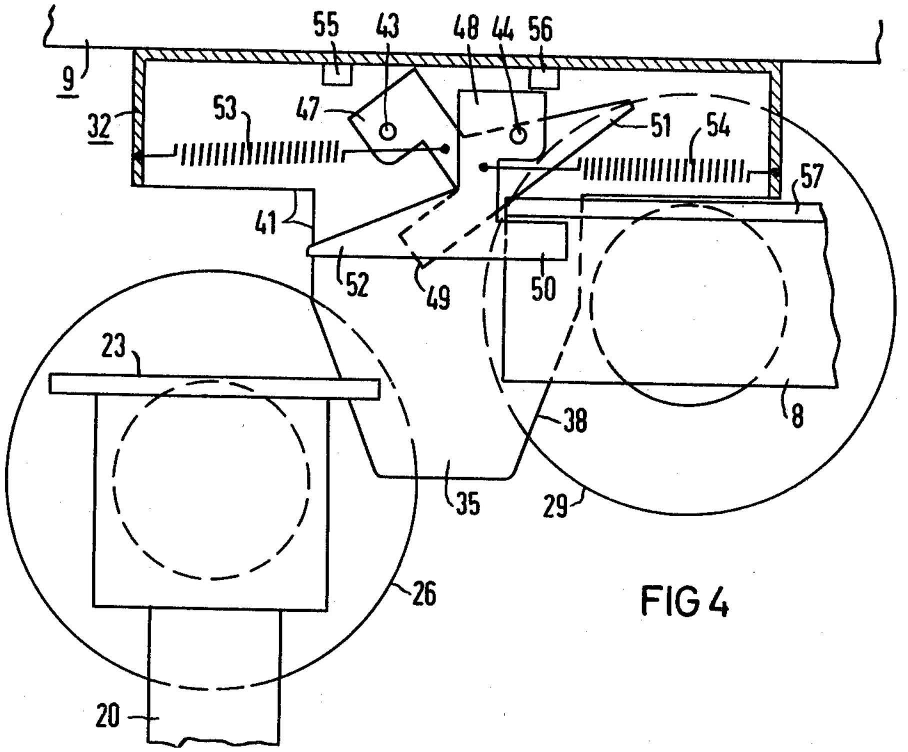
FIG. 4 is an enlarged illustration of the latches of a coupling as shown in FIG. 3 immediately before the placement of the examination table onto the transport carrier.

Under the four corners of the frame 10 of the patient positioning table 9, there is, in each instance, a coupling 30, 31, 32 (only three are illustrated), whose one housing wall is shaped as a guide finger 33, 34, 35 in the manner of a chain wheel cog, as FIGS. 3 and 4 clearly show. In the exemplary embodiment, the formed pieces 27, 28, 29 of the support frame 8 are adapted in their mutual interval along the table longitudinal direction to the interval of the guide flanks 36, 37, 38 which face one another and the formed pieces 24, 25, 26 of the transport carrier 14 are adapted in their mutual interval along the table longitudinal direction to the guide flanks 39, 40, 41 of the guide fingers 33, 34, 35 which face away from one another. The guide flanks of the guide fingers are slanted in order to facilitate the centering of the frame 10 of the patient positioning table 9 to the formed pieces 24 through 29 of the transport carrier 14 or, respectively, of the support frame 8.

In this housing of each coupling 30, 31, 32, two axles 42, 43, 44 (only three are illustrated) aligned parallel to the plane of the patient positioning table are secured, around which one respective latch 45, 46, 47, 48 stamped out of a flat material is rotatably mounted. The latches have an essentially rectangular hook 49, 50 and an extension 51, 52 which is designed like a rearward extension of the hook. Each latch has a tension spring 53, 54 (only two are visible) allocated to it which pulls said latch against a stop 55, 56 and, thus, into the stable end position shown in FIG. 3. As FIG. 4 shows, in this stable end position the latches with their hooks can engage under the coupling plates 21, 22, 23 of the transport carrier 14 or also under the similarly designed support frame parts 57, 58. The latter is the case in the illustration of the exemplary embodiment. The two latches 45, 46, 47, 48 of each coupling 30, 31, 32 are arranged back-to-back and laterally displaced in such manner that the extension 51, 52 of each latch in the stable end position extends parallel next to the hook 49, 50 of the respectively other latch.

For the exact positioning of the transport carrier 14 under the support frame 8, U-tracks 63, 64 (FIG. 2) which are open at the top are secured on the floor, into which tracks the transport carrier 14 can be driven. Moreover, a nose 66 (FIG. 1) is welded onto a brace 65 proceeding in the longitudinal direction of the transport carrier on the side facing the support pillar 4. Upon a correct positioning of the transport carrier 14, this nose engages with a microswitch 67 which is arranged on the support pillar 4. The microswitch is connected with the electric circuit for the lowering movement of the support pillar in such a manner that the support pillar can be lowered below a height at which the transport carrier 14 is no longer insertable under the support frame only when the microswitch is actuated.

When the patient positioning table 9 with its frame 10 rests on the support frame 8 of the support pillar 4, then the walls provided with the guide fingers 33, 34, 35 of each of the four couplings 30, 31, 32 are supported with their guide flanks on the formed pieces 27, 28, 29 of the support frame 8. At the same time, the guide fingers 33, 34, 35 of the couplings 30, 31, 32 laterally abut with their guide flanks on the outside against the formed pieces 27, 28, 29 of the support frame. Since the formed pieces, as FIG. 2 shows, are provided with a type of wheel rim 59, 60, 61, 62, the frame 10 of the patient positioning table 9 is prevented by a positive lock from displacing itself in the longitudinal or transverse direction with respect to the support frame. But it can also not be lifted off perpendicular to the plane of the support frame 8, because, upon the seating of the couplings against the form pieces 27, 28, 29 of the support frame 8, in each instance, one of the two latches 45, 46, 47, 48 of each coupling engages under the profile of the support frame part 57, 58 (see FIG. 4, for example) with its hooks 49, 50 in its spring-loaded stable end position. Thus, even with a rotation of the support frame 8 by 360° around the horizontal tilt axle 6, the patient positioning table 9 would remain immovably anchored on the support frame.

As FIG. 4 clearly shows, upon the seating of the formed piece 29 of the support frame 8 against the guide flank of the coupling 32, the support frame part 57 presses the extension 51 of the latch 47 provided for the coupling with the transport carrier 14 up, so that the hook 49 of this latch is slued (tilted) out of its stable end position against the force of the appertaining spring 53. This now allows the support frame 8 together with the patient positioning table 9 lying on it to be lowered onto the transport carrier 14. Because the latch 47 for the transport carrier has been rotated out of its end position, the coupling plate 23 of the transport carrier 14 can now, without any operation with this latch, be lowered until the seating of the guide flank 41 of the corresponding coupling onto the formed piece 26 of the transport carrier. Thereby, during the final part of its path, the coupling plate 23 of the transport carrier presses—just as the support frame part previously—the extension 52 of the latch 48 allocated for the coupling with the support frame 8 against the force of the spring 54 out of its stable end position into its non-engaged position.

From that moment when the formed pieces 27, 28, 29 of the support frame 8 as well as the formed pieces 24, 25, 26 of the transport carrier 14 abut against the guide flanks 36 through 41 of the couplings 30, 31, 32, all of the latches 45, 46, 47, 48 of the couplings are pressed into their non-engaged position. Only in this position could the patient positioning table 9 be freely lifted off. If this does not occur, but, for example, the support pillar 4 with the support frame 8 for the patient positioning table 9 is again lowered, then the couplings remain lying on the formed pieces of the transport carrier 14 whereas the support frame 8 moves further away from the patient positioning table in a downward direction. Thereby, however, the support frame parts 57 (FIG. 4) become disengaged from the extensions of the latches intended for the coupling with the transport carrier. These can now be pulled back into their stable end position by means of the force of their springs. Thereby, with their hooks which rotated under the coupling plates 21, 22, 23 of the transport carrier, they lock the transport carrier with the frame of the patient positioning table, because the frame of the patient positioning table is of course secured against lateral displacement relative to the transport carrier by the seating of the formed pieces 24, 25, 26 of the transport carrier 14 against the outer guide flanks 41 of the coupling or, respectively, of their guide fingers.

If, in an inverted sequence, the support frame 8 for the patient positioning table 9 were ridden up from below against the frame 10 of the patient positioning table resting on the transport carrier 14, then the support frame, upon its approach, would first press the latches for the transport carrier out of their resting position via their extensions projecting into the path of the support frame parts 57, 58. Thereby, these would disengage from the coupling plates 21, 22, 23 of the transport carrier 14. The support frame 8, which continues to ride up, can therefore lift the patient positioning table from the transport carrier 14. As soon as the extensions of the latches allocated to the support frame disengage from the coupling plates 21, 22, 23 of the transport carrier, the latches couple firmly with the support frame parts.

Figure 5:
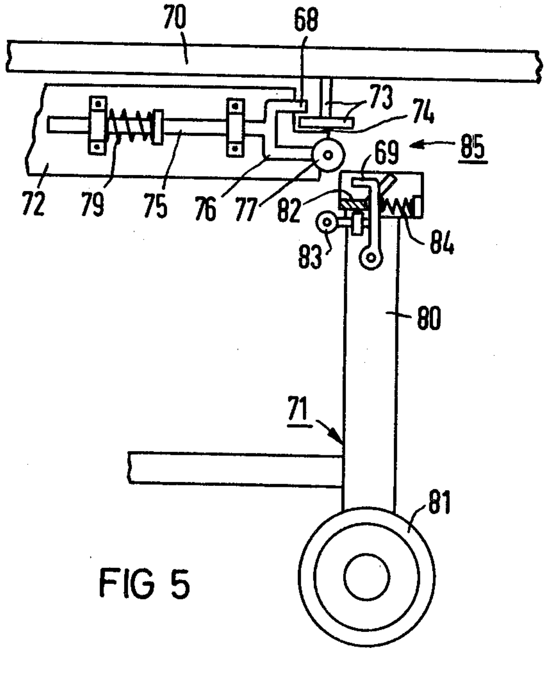
FIG. 5 shows another construction for the latch control.

FIG. 5 shows another embodiment of the examination installation in which the latches 68, 69 are no longer secured to the patient positioning table 70, but rather to the transport carrier 71 and to a different support frame 72 of the support pillar 4. On the basis of a section of the patient positioning table 70. FIG. 5 shows how this rests with its frame 73 on a seating surface 74 of the support frame 72. The support frame 72 bears a fork 75 movably mounted along its axis of symmetry, whose one tine 76 bears a stop roller 77 and whose other tine is designed as a latch. The fork is pressed under the frame 73 of the patient positioning table 70 by means of a compression spring 79. One of the four posts 80 of the transport carrier 71 with a part of a caster 81 can be seen under the patient positioning table 70. The post bears an angular seating surface 82 for the frame 73 of the patient positioning table 70, a spring-loaded latch 69 and a stop roller 83, by means of which the latch can be pressed back against the force of the compression spring 84. The two latches 68, 69 together with the seating surfaces 74, 82 and the frame 73 of the patient positioning table 70 likewise form a coupling 85.

When the transport carrier 71, as is described on the basis of FIGS. 1 and 2, is positioned under the support frame 72 by being introduced into the U-tracks 63, 64 attached to the floor, then the transport carrier 71 triggers the pawl 67 (FIG. 1) on the support pillar 4 in the same manner as the transport carrier 14, so that this support pillar 4 can be further lowered. When the support frame 72 with the patient positioning table 70 resting thereon is further lowered onto the transport carrier 71, the stop roller 77 of the support frame 72 is pressed back by the corresponding post 80 of the transport carrier 71. Thereby, the fork 75 is pushed back against the force of the compression spring 79 and the latch 68 is disengaged from the frame 73 of the patient positioning table 70. At the same time, the stop roller 83 of the post 80 of the transport carrier 71 is pressed back by the support frame 72. Thereby, the latch 69 of the transport carrier 71 is pulled back against the force of the compression spring 84. The lowering movement of the patient positioning table 70 can be continued until the frame 73 of the patient positioning table touches down on the angular seating surface 82 of the transport carrier 71. Upon the further lowering of the support frame 72, the patient positioning table 70 rests on the transport carrier 71. As soon as the support frame 72 has been moved past the stop roller 83 of the transport carrier 71, the compression spring 84 can again press the latch 69 and the stop roller 83 forward. The latch 69 of the transport carrier 71 then engages over the frame 73 of the patient positioning table 70 and locks this on the transport carrier 71. The transport carrier 71 with the patient positioning table now fastened onto it can be taken away. The transfer from the transport carrier onto the support frame ensues in an exactly inverted sequence.

It will be apparent that many modifications and variations may be effected without departing from the scope of the novel concepts and teachings of the present invention.

I claim as my invention:

1. An examination installation comprising a table support, a transport carrier, a patient positioning table that can be transferred from the transport carrier onto the table support, couplings for the connection of the patient positioning table with the transport carrier and with the table support that adjust themselves upon the relative approach of the patient positioning table to the transport carrier and to the table support, each of the couplings (30, 31, 32, 85) comprising at least two latches (45 through 48, 68, 69) movable into a respective latching position, means whereby one of said latches in its latching position couples the patient positioning table (9, 70) to the transport carrier (14, 71) and can be pressed out of the latching position and into a non-engaged position by means of the table support (4, 7, 8, 72), and means whereby the other of said latches in its latching position couples the patient positining table to the table support and can be pressed out of its latching position into a non-engaged position by means of the transport carrier.

2. An examination installation according to claim 1, characterized in that each latch (45 through 48) is provided with a rearward extension (51, 52) for effecting rotation of the latch into the non-engaged position, means whereby the extension (51) in the case of the latch (47) serving for the coupling of the patient positioning table (9) with the transport carrier (14) causes such latch to be pressed into the non-engaged position upon placement of the patient positioning table (9) onto the table support (4, 7, 8), and means whereby the extension (52) in the case of the latch (48) serving for the coupling with the table support causes such latch to be pressed into the non-engaged position upon placement of the patient positioning table onto the transport carrier.

3. An examination installation according to claim 1, characterized in that a part of the latches (68) is movably mounted on the table support (70, 72) and a part of the latches (69) is movably mounted on the transport carrier (71).

4. An examination installation according to claim 1, characterized in that the latches (45 through 48) of the couplings (31, 31, 32) are all rotatably mounted on the patient positioning table (9).

5. An examination installation according to claim 1, characterized in that guiding means (33 through 41, 73, 74, 82) that center upon engagement during the approach of the patient positioning table (9, 70) to the transport carrier or to the table support are allocated to the couplings (30, 31, 32, 85).

6. An examination installation according to claim 5, characterized in that the guiding means comprise guides located on the patient positioning table (9) and on the sides of the transport carrier (14) and of the table support (4, 7, 8), the guides on the sides of the transport carrier and of the table support comprising respectively four formed pieces (24 through 29) designed in the manner of a railroad wheel, and the guides located on the patient positioning table (9) being arranged for coupling with such pieces and being designed in the manner of a track piece with a respective guide flank (36 through 41) projecting perpendicular to the track plane.

7. An examination installation according to claim 6, characterized in that the guides located on the patient positioning table (9) for coupling with the guides on the transport carrier and with the guides on the table support are in each instance arranged immediately next to one another and are combined to one respective uniform guide finger (33, 34, 35) formed in the manner of a chain wheel cog.

8. An examination installation according to claim 1, characterized in that the latches (45 through 48, 68, 69) are held in their latching position by means of spring power.

9. An examination installation according to claim 1, characterized in that the patient positioning table (9, 70) can be selectively coupled to the transport carrier and to the table support at four separate locations.

10. An examination installation according to claim 1, the table support (4, 7, 8, 72) and the transport carrier (14, 71) having cooperating sensor means (66, 67) for interengagement when the transport carrier is in a centered position with respect to the table support (4, 7, 8, 72).

* * * * *